US012781950B2

(12) United States Patent
Deng

(10) Patent No.: US 12,781,950 B2
(45) Date of Patent: Nov. 3, 2026

(54) STRUCTURES, APPARATUSES, AND METHODS FOR MODIFYING VOLTAGE ON LIGHT STRINGS

(71) Applicant: DONGGUAN YONGFENG LIGHTING CO., LTD, Dongguan City (CN)

(72) Inventor: Zhumei Deng, Dongguan (CN)

(73) Assignee: DONGGUAN YONGFENG LIGHTING CO., LTD, Dongguan City (CN)

( * ) Notice: Subject to any disclaimer, the term of this patent is extended or adjusted under 35 U.S.C. 154(b) by 0 days.

(21) Appl. No.: 18/957,489

(22) Filed: Nov. 22, 2024

(65) Prior Publication Data

US 2026/0146732 A1 May 28, 2026

(51) Int. Cl.
*F21V 23/00* (2015.01)
*F21S 4/10* (2016.01)
(Continued)

(52) U.S. Cl.
CPC .............. *F21V 23/023* (2013.01); *F21S 4/10* (2016.01); *F21V 23/001* (2013.01); *F21V 23/06* (2013.01)

(58) Field of Classification Search
CPC ........ F21S 4/10; F21V 23/001; F21V 23/023; F21V 23/06; F21V 31/005; F21V 23/002;
(Continued)

(56) References Cited

U.S. PATENT DOCUMENTS 6,120,312 A * 9/2000 Shu ..................... F21V 19/0005 439/356
6,461,019 B1 * 10/2002 Allen ...................... F21V 19/04 362/249.14
(Continued)

FOREIGN PATENT DOCUMENTS

CN 2217843 Y * 1/1996
CN 108882434 A * 11/2018 ............. H05B 45/37

OTHER PUBLICATIONS

Search English translation of CN-2217843-Y (Year: 1996).*
English translation of CN 108882434 A (Year: 2018).*

*Primary Examiner* — Omar Rojas Cadima
(74) *Attorney, Agent, or Firm* — Enable IP, P.C.

(57) ABSTRACT

Structures, apparatuses, and methods are disclosed in relation to modifying voltage on light strings, including rectifying or reducing voltage. An apparatus may comprise: an electronic component holder structure for holding electronic components; a base structure for receiving the electronic component holder structure; and a cap structure, wherein the base structure and the cap structure together encase the electronic component holder structure, wherein the base structure includes a bottom part for receiving electrical contacts. Another apparatus may comprise: a section of electrical components including light-emitting elements; electrical bus lines for supplying power from a power source to the light-emitting elements; a first casing comprising voltage-modifying electrical components, electrically connected to a first end of the section of electrical components; and a second casing comprising additional voltage-modifying electrical components, electrically connected to a second end of the section of electrical components.

8 Claims, 7 Drawing Sheets

(51) Int. Cl.
*F21V 23/02* (2006.01)
*F21V 23/06* (2006.01)

(58) Field of Classification Search
CPC ...... F21V 23/02; F21V 21/002; F21V 23/009; F21V 17/164; F21V 19/0015; F21V 19/003; F21V 19/004; F21V 23/003; F21V 23/008; H05K 2201/09181; H05K 2201/096; H05K 1/141; H05K 1/117; H01R 33/06; H01R 12/714; H01R 2103/00; H01R 24/28; H01R 31/06; H01R 33/18; H01R 33/88; H05B 45/30; H05B 45/00; H05B 45/40; H05B 45/37; H05B 45/10; H05B 45/375; H05B 45/38; H05B 45/395
See application file for complete search history.

(56) References Cited

U.S. PATENT DOCUMENTS

| | | | | |
|---|---|---|---|---|
| 7,575,362 | B1 * | 8/2009 | Hsu | H01R 33/09<br>362/652 |
| 11,680,686 | B1 * | 6/2023 | Lei | F21K 9/235<br>362/363 |
| 2004/0264191 | A1 * | 12/2004 | Takano | F21V 19/0095<br>362/267 |
| 2020/0006900 | A1 * | 1/2020 | Durse | H01R 13/4367 |

* cited by examiner

STRUCTURES, APPARATUSES, AND METHODS FOR MODIFYING VOLTAGE ON LIGHT STRINGS

FIELD

This relates to light strings, and more particularly, to structures, apparatuses, and methods for modifying voltage on light strings, including rectifying or reducing voltage. The light strings may include high-voltage plug-in light strings, including high-voltage plug-in series parallel light strings.

BACKGROUND

Currently, there are no simple methods of voltage reduction and rectification of light strings.

SUMMARY

In some aspects, this disclosure relates to structures, apparatuses, and methods for casing electronic components, which may be applicable to modifying voltage on light strings. In some aspects, this disclosure relates to structures, apparatuses, and methods for modifying voltage on light strings, including rectifying or reducing voltage.

DETAILED DESCRIPTION

Embodiments of the present disclosure will be described below in conjunction with the accompanying drawings, but it should be appreciated by those skilled in the art that the embodiments described below are exemplary, rather than exhaustive. They are only used to illustrate the present disclosure and should not be regarded as limiting the scope of the present disclosure. All other embodiments obtained by those of ordinary skill in the art without creative efforts based on the embodiments disclosed herein shall fall within the scope of the present disclosure.

This disclosure relates to relates to light strings, and more particularly, to structures, apparatuses, and methods for modifying voltage on light strings, including rectifying or reducing voltage. The light strings may include high-voltage plug-in light strings, including high-voltage plug-in series parallel light strings. This disclosure provides one or more example structures, equipped with voltage-rectifying electrical components (e.g., 1N4001, 1N4007, or similar rectifying diodes) (and may include voltage-reducing electrical components, e.g., resistors), for rectifying voltage (and may include reducing voltage) on high-voltage series plug-in light strings (e.g., converting the AC power on the light string to DC power). These structures may be easy to produce and may reduce costs.

Figures 1A, 1B, 1C, 1D:
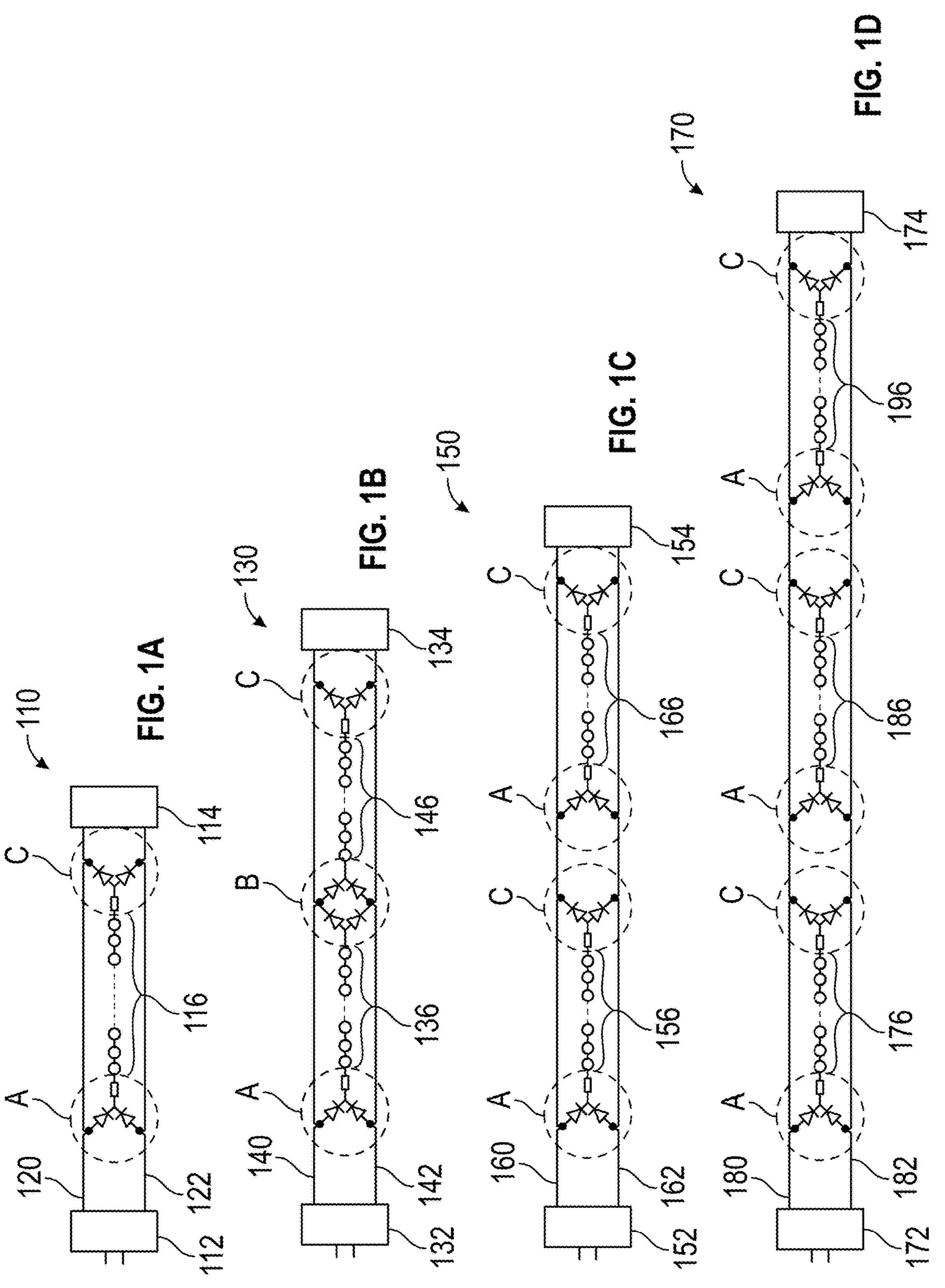
FIGS. 1A-1D illustrate schematic diagrams of multiple types of light string circuits, according to embodiments of the disclosure.

FIGS. 1A-1D illustrate schematic diagrams of multiple types of light string circuits. A light string circuit may comprise one or more sections of electrical components. Each section of electrical components may comprise one or more light-emitting elements. FIG. 1A shows a first type 110 of circuitry having a single section 116 including one or more light-emitting elements. FIG. 1B shows a second type 130 of circuitry having two sections 136, 146 each including one or more light-emitting elements. FIG. 1C shows a third type 150 of circuitry having two sections 156, 166 each including one or more light-emitting elements. FIG. 1D shows a fourth type 170 of circuitry having three or more sections 176, 186, 196 each including light-emitting elements. Teachings of FIGS. 1A-1D may be applied to high-voltage plug-in light strings, including high-voltage plug-in series parallel light strings. Light-emitting elements may include light-emitting diodes (LEDs) or other suitable light-emitting devices or light sources.

Each type of circuitry in FIGS. 1A-1D may include a respective connector (e.g., a plug, a male end, etc.) for connecting the respective light string circuit to a power source (e.g., an electrical outlet, AC (alternating current) power outlet, etc.). FIG. 1A shows an electrical plug 112. FIG. 1B shows an electrical plug 132. FIG. 1C shows an electrical plug 152. FIG. 1D shows an electrical plug 172.

Each type of circuitry in FIGS. 1A-1D may include a respective end part (e.g., a female end, a dead end, a termination cap, etc.) that is at another end of the light string from the power source end. FIG. 1A shows an end part 114. FIG. 1B shows an end part 134. FIG. 1C shows an end part 154. FIG. 1D shows an end part 174. An end part may be a female end of a first light string circuit that can receive a male end (e.g., having an electrical plug) of a second light string circuit, so that two light string circuits can be joined together to create a longer run of light-emitting elements powered by a single power source. An end part may be a dead end of a termination cap where the end part is sealed or capped off, which may prevent the light string from extending further and help insulate the end part from moisture and dust, e.g., in outdoor usage environments.

Each type of circuitry in FIGS. 1A-1D may include overall parallel electrical lines that function to supply power from a power source to the electrical components, e.g., the light-emitting elements. Such overall parallel electrical lines may be called main lines or bus lines. FIG. 1A shows a first main (or bus) line 120 and a second main (or bus) line 122. FIG. 1B shows a first main (or bus) line 140 and a second main (or bus) line 142. FIG. 1C shows a first main (or bus) line 160 and a second main (or bus) line 162. FIG. 1D shows a first main (or bus) line 180 and a second main (or bus) line 182.

Each type of circuitry in FIGS. 1A-1D may include one or more casings of different casing types. FIG. 1A shows the first type 110 of circuitry having a casing type A and a casing type C at the ends of the single section 116 including one or more light-emitting elements. FIG. 1B shows the second type 130 of circuitry having, in order, a casing type A, then a first section 136 including one or more light-emitting elements, then a casing type B, a second section 146 including one or more light-emitting elements, and then a casing type C. FIG. 1C shows the third type 150 of circuitry having, in order, a first instance of the casing type A, a first section 156 including one or more light-emitting elements, a first instance of the casing type C, then a second instance of the casing type A, a second section 166 including one or more light-emitting elements, and a second instance of the casing type C. FIG. 1D shows the fourth type 170 of circuitry having, in order, a first instance of the casing type A, a first section 176 including one or more light-emitting elements, a first instance of the casing type C, then a second instance of the casing type A, a second section 186 including one or more light-emitting elements, a second instance of the casing type C, then a third instance of the casing type A, a third section 196 including one or more light-emitting elements, and a third instance of the casing type C.

Figure 2:
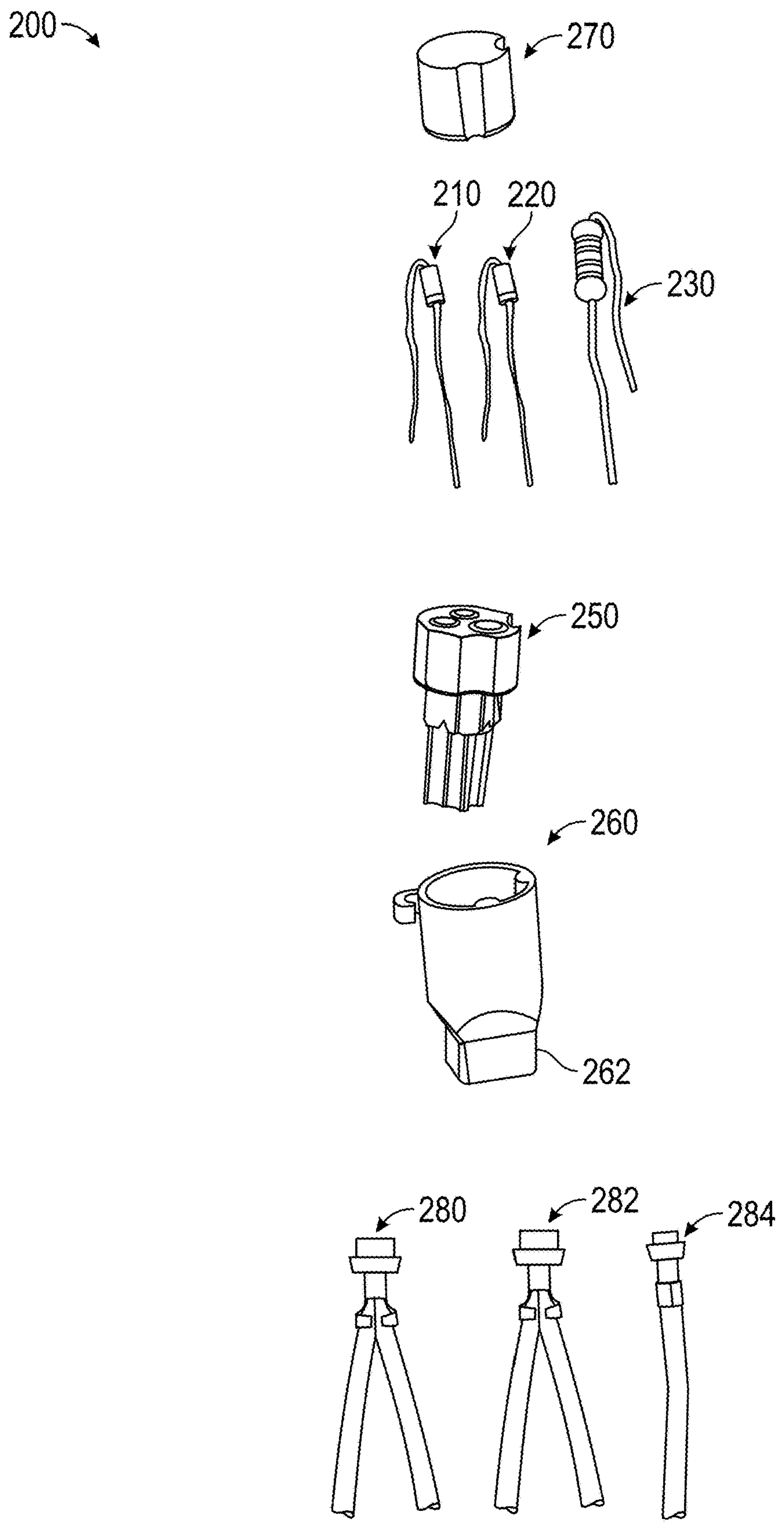
FIGS. 2-4 illustrate examples of the casing types A, B, and C, respectively, according to embodiments of the disclosure.
Figure 3:
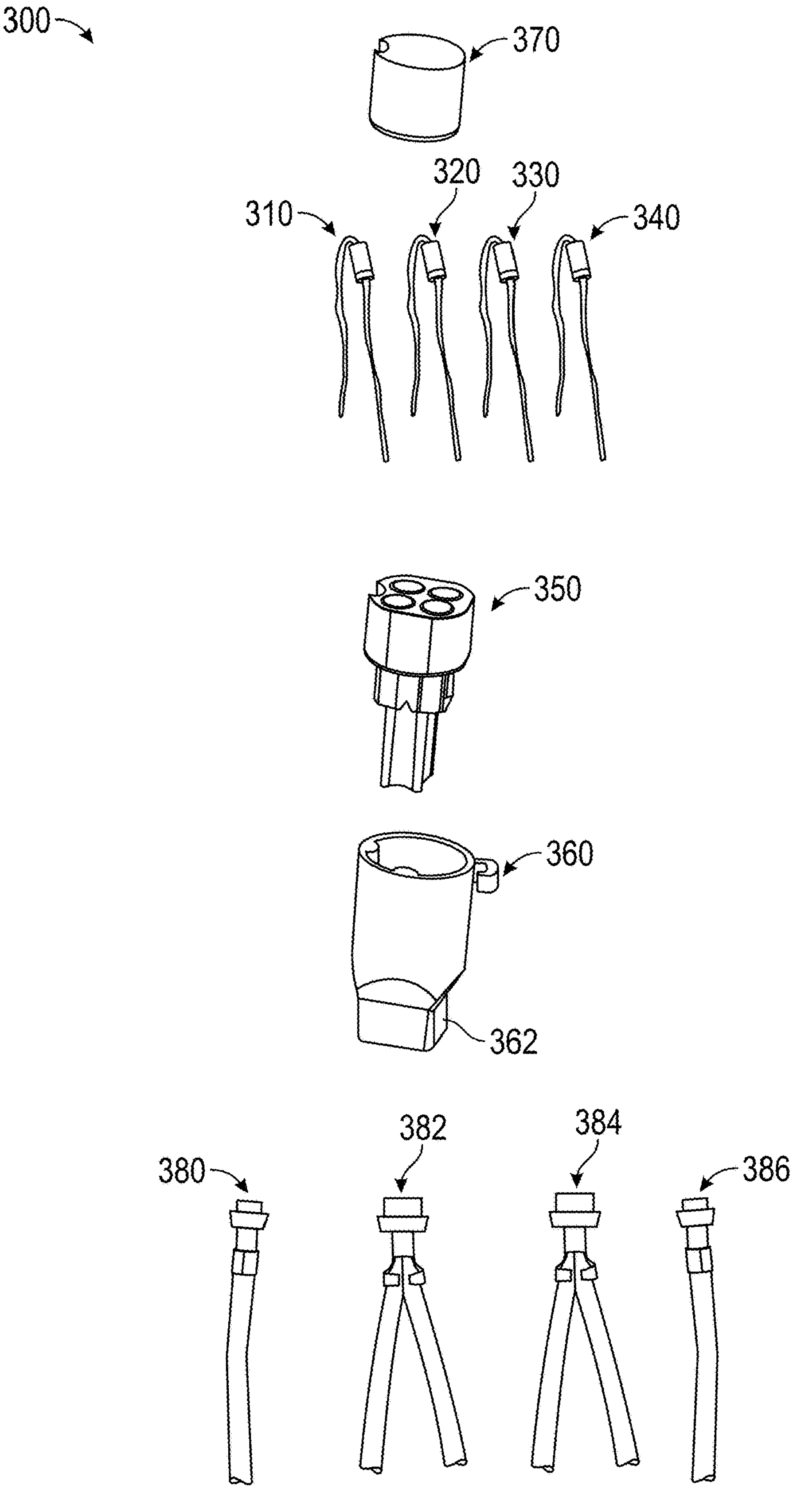
Figure 4:
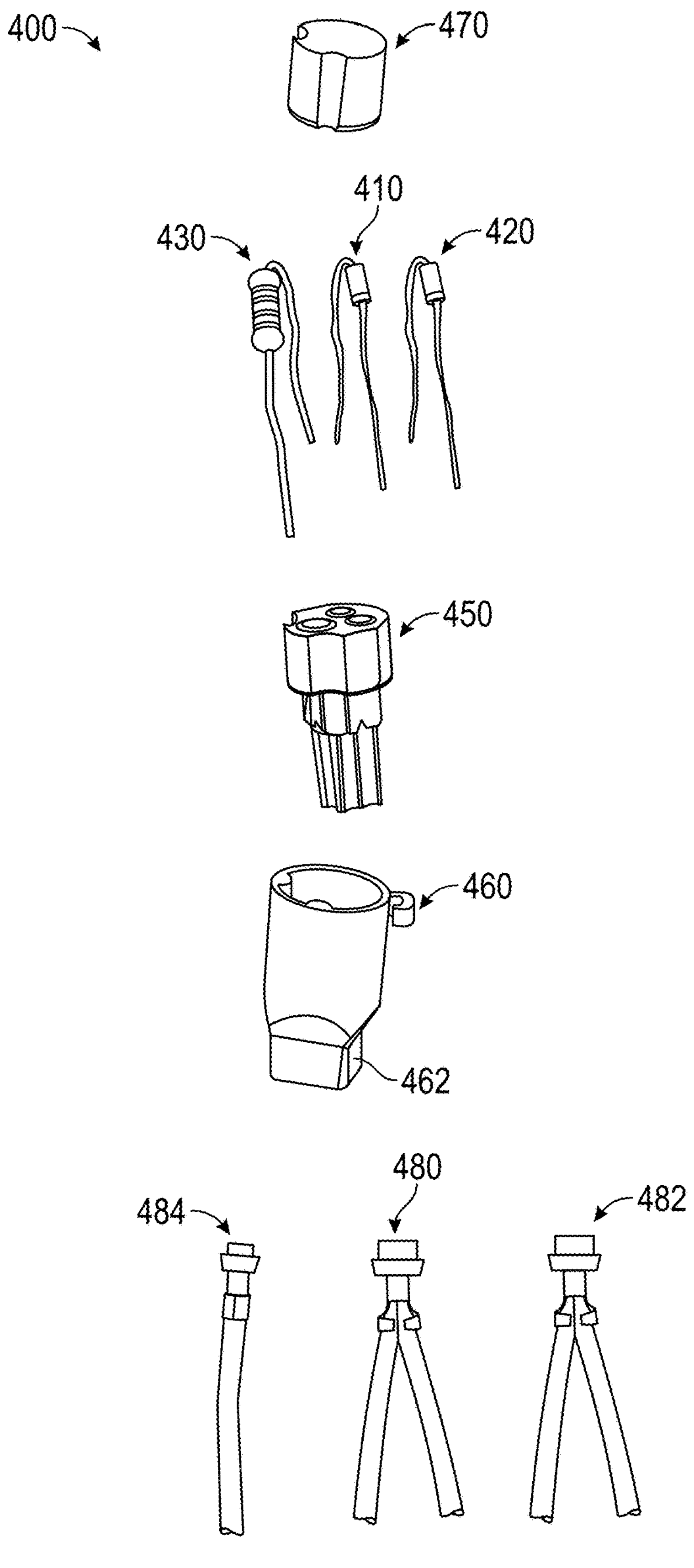

FIGS. 2-4 illustrate examples of the casing types A, B, and C, respectively. The casing types A-C can encase electronic components (e.g., a rectifier diode, a resistor, etc.) and electrically connect the electronic components to electrical contacts of electrical conductors (e.g., electrical wires).

FIG. 2 shows an example casing 200 of casing type A where two rectifier diodes 210, 220 and a resistor 230 can be placed into a rectifier holder 250, which can be placed into a rectifier base 260. A top cap 270 with the rectifier base 260 may together encase the elements contained within the rectifier base 260 and the rectifier holder 250. The top cap 270 and the rectifier base 260 may form the encasement by any suitable, physically secure, electrically safe manner, e.g., attaching, affixing, snap-fit, screw-on threads, press-fit, friction-fit, latch, clip, etc.

A bottom part 262 of the rectifier base 260 may be formed to receive three electrical contacts: a first two-wire contact 280, a second two-wire contact 282, and a single-wire contact 284. To keep the contacts 280, 282, 284 electrically isolated from each other when attached or inserted into the bottom part 262, the rectifier holder 250 and/or the rectifier base 260 may include flanges or walls formed in a manner that isolates the contacts 280, 282, 284 when the rectifier holder 250 and the rectifier base 260 are assembled together. In casing 200, the elements are arranged such that they match the electrical connections of casing type A shown in the schematic diagrams of FIGS. 1A-1D. For example, the rectifier holder 250 and the rectifier base 260 may be formed in an arrangement to guide the electrical leads of the two rectifier diodes 210, 220 and the resistor 230 to match the electrical connections of casing type A.

The first two-wire contact 280 may electrically connect a first lead of the first rectifier diode 210 to a first main (or bus) line. For example, the first lead (wire) of the first rectifier diode 210 may be inserted, from above, into a first lead hole of rectifier holder 250, and then come out of that first lead hole, from below, and then be folded back upward along a first lower exterior side of rectifier holder 250, wherein the fold in the first lead (wire) of the first rectifier diode 210 can form an electrical contact point to the first two-wire contact 280 attached at the bottom part 262.

The second two-wire contact 282 may electrically connect a first lead of the second rectifier diode 220 to a second main (or bus) line. For example, the first lead (wire) of the second rectifier diode 220 may be inserted, from above, into a second lead hole of rectifier holder 250, and then come out of that second lead hole, from below, and then be folded back upward along a second lower exterior side of rectifier holder 250, wherein the fold in the first lead (wire) of the second rectifier diode 220 can form an electrical contact point to the second two-wire contact 282 attached at the bottom part 262.

The single-wire contact 284 may electrically connect a first lead of the resistor 230 to a section of light-emitting elements. For example, the first lead (wire) of the resistor 230 may be inserted, from above, into a third lead hole of rectifier holder 250, and then come out of that third lead hole, from below, and then be folded back upward along a third lower exterior side of rectifier holder 250, wherein the fold in the first lead (wire) of the resistor 230 can form an electrical contact point to the single-wire contact 284 attached at the bottom part 262.

When the two rectifier diodes 210, 220 and the resistor 230 are inserted into the rectifier holder 250, the shape and size of the first, second, and third lower exterior sides of the rectifier holder 250 may be designed to prevent their folded leads from touching each other (e.g., suitably largely enough so that the lengths of the folded first leads cannot reach each other, suitably shaped like compartments so that the folded first leads cannot reach each other, etc.).

The rectifier holder 250 and the rectifier base 260 may guide a second lead of the first rectifier diode 210, a second lead of the second rectifier diode 220, and a second lead of the resistor 230 to electrically join together at a common electrical connection or contact or junction, as shown in the center of casing type A shown in the schematic diagrams of FIGS. 1A-1D. For example, when their first leads (wires) are inserted downward into their respective holes of rectifier holder 250, the center bodies of the two rectifier diodes 210, 220 and the resistor 230 may be held within an upper body of the rectifier holder 250 such that their second leads (wires) are sticking out upward, and thus the second leads (wires) may be twisted together to form the common electrical connection or contact or junction.

FIG. 3 shows an example casing 300 of casing type B where four rectifier diodes 310, 320, 330, 340 can be placed into a rectifier holder 350, which can be placed into a rectifier base 360. A top cap 370 with the rectifier base 360 may together encase the elements contained within the rectifier base 360 and the rectifier holder 350. The top cap 370 and the rectifier base 360 may form the encasement by any suitable, physically secure, electrically safe manner, e.g., attaching, affixing, snap-fit, screw-on threads, press-fit, friction-fit, latch, clip, etc.

A bottom part 362 of the rectifier base 360 may be formed to receive four electrical contacts: a first single-wire contact 380, a first two-wire contact 382, a second two-wire contact 384, and a second single-wire contact 386. To keep the contacts 380, 382, 384, 386 electrically isolated from each other when attached or inserted into the bottom part 362, the rectifier holder 350 and/or the rectifier base 360 may include flanges or walls formed in a manner that isolates the contacts 380, 382, 384, 386 when the rectifier holder 350 and the rectifier base 360 are assembled together. In casing 300, the elements are arranged such that they match the electrical connections of casing type B shown in the schematic diagrams of FIGS. 1A-1D. For example, the rectifier holder 350 and the rectifier base 360 may be formed in an arrangement to guide the electrical leads of the four rectifier diodes 310, 320, 330, 340 to match the electrical connections of casing type B.

The first single-wire contact 380 may electrically connect a first lead of a first rectifier diode 310 and a first lead of a second rectifier diode 320 to a first section of light-emitting elements. For example, the first lead (wire) of the first rectifier diode 310 may be inserted, from above, into a first lead hole of rectifier holder 350, and then come out of that first lead hole, from below, and then be folded back upward along a first lower exterior side of rectifier holder 350. The first lead (wire) of the second rectifier diode 320 may be inserted, from above, into a second lead hole of rectifier holder 350, and then come out of that second lead hole, from below, and then be folded back upward along the first lower exterior side of rectifier holder 350. The first lead hole and the second lead hole of rectifier holder 350 may be located in close proximity to each other, in order to guide both the first lead (wire) of the first rectifier diode 310 and the first lead (wire) of the second rectifier diode 320 to be in close proximity to each other to touch or contact, e.g., at their folds, at the first lower exterior side of rectifier holder 350, etc. The fold in the first lead (wire) of the first rectifier diode 310 and/or the fold in the first lead (wire) of the second rectifier diode 320 can form an electrical contact point to the first single-wire contact 380 attached at the bottom part 362.

The first two-wire contact 382 may electrically connect a second lead of the first rectifier diode 310 and a first lead of a third rectifier diode 330 to a first main (or bus) line. For example, the second lead (wire) of the first rectifier diode 310 may be inserted, from above, into a third lead hole of rectifier holder 350, and then come out of that third lead hole, from below, and then be folded back upward along a second lower exterior side of rectifier holder 350. The first lead (wire) of the third rectifier diode 330 may be inserted, from above, into a fourth lead hole of rectifier holder 350, and then come out of that fourth lead hole, from below, and then be folded back upward along the second lower exterior side of rectifier holder 350. The third lead hole and the fourth lead hole of rectifier holder 350 may be located in close proximity to each other, in order to guide both the second lead (wire) of the first rectifier diode 310 and the first lead (wire) of the third rectifier diode 330 to be in close proximity to each other to touch or contact, e.g., at their folds, at the second lower exterior side of rectifier holder 350, etc. The fold in the second lead (wire) of the first rectifier diode 310 and/or the fold in the first lead (wire) of the third rectifier diode 330 can form an electrical contact point to the first two-wire contact 382 attached at the bottom part 362.

The second two-wire contact 384 may electrically connect a second lead of the second rectifier diode 320 and a first lead of a fourth rectifier diode 340 to a second main (or bus) line. For example, the second lead (wire) of the second rectifier diode 320 may be inserted, from above, into a fifth lead hole of rectifier holder 350, and then come out of that fifth lead hole, from below, and then be folded back upward along a third lower exterior side of rectifier holder 350. The first lead (wire) of the fourth rectifier diode 340 may be inserted, from above, into a sixth lead hole of rectifier holder 350, and then come out of that sixth lead hole, from below, and then be folded back upward along the third lower exterior side of rectifier holder 350. The fifth lead hole and the sixth lead hole of rectifier holder 350 may be located in close proximity to each other, in order to guide both the second lead (wire) of the second rectifier diode 320 and the first lead (wire) of the fourth rectifier diode 340 to be in close proximity to each other to touch or contact, e.g., at their folds, at the third lower exterior side of rectifier holder 350, etc. The fold in the second lead (wire) of the second rectifier diode 320 and/or the fold in the first lead (wire) of the fourth rectifier diode 340 can form an electrical contact point to the second two-wire contact 384 attached at the bottom part 362.

The second single-wire contact 386 may electrically connect a second lead of the third rectifier diode 330 and a second lead of the fourth rectifier diode 340 to a second section of light-emitting elements. For example, the second lead (wire) of the third rectifier diode 330 may be inserted, from above, into a seventh lead hole of rectifier holder 350, and then come out of that seventh lead hole, from below, and then be folded back upward along a fourth lower exterior side of rectifier holder 350. The second lead (wire) of the fourth rectifier diode 340 may be inserted, from above, into an eighth lead hole of rectifier holder 350, and then come out of that eighth lead hole, from below, and then be folded back upward along the fourth lower exterior side of rectifier holder 350. The seventh lead hole and the eighth lead hole of rectifier holder 350 may be located in close proximity to each other, in order to guide both the second lead (wire) of the third rectifier diode 330 and the second lead (wire) of the fourth rectifier diode 340 to be in close proximity to each other to touch or contact, e.g., at their folds, at the fourth lower exterior side of rectifier holder 350, etc. The fold in the second lead (wire) of the third rectifier diode 330 and/or the fold in the second lead (wire) of the fourth rectifier diode 340 can form an electrical contact point to the second single-wire contact 386 attached at the bottom part 362.

When the four rectifier diodes 310, 320, 330, 340 are inserted into the rectifier holder 350, the shape and size of the first, second, third, and fourth lower exterior sides of the rectifier holder 350 may be designed to prevent their folded leads from touching each other (e.g., suitably largely enough so that the lengths of the folded leads cannot reach each other, suitably shaped like compartments so that the folded leads cannot reach each other, etc.)

FIG. 4 shows an example casing 400 of casing type C where a resistor 430 and two rectifier diodes 410, 420 can be placed into a rectifier holder 450, which can be placed into a rectifier base 460. A top cap 470 with the rectifier base 460 may together encase the elements contained within the rectifier base 460 and the rectifier holder 450. The top cap 470 and the rectifier base 460 may form the encasement by any suitable, physically secure, electrically safe manner, e.g., attaching, affixing, snap-fit, screw-on threads, press-fit, friction-fit, latch, clip, etc.

A bottom part 462 of the rectifier base 460 may be formed to receive three electrical contacts: a single-wire contact 484, a first two-wire contact 480, and a second two-wire contact 482. To keep the contacts 484, 480, 482 electrically isolated from each other when attached or inserted into the bottom part 462, the rectifier holder 450 and/or the rectifier base 460 may include flanges or walls formed in a manner that isolates the contacts 484, 480, 482 when the rectifier holder 450 and the rectifier base 460 are assembled together. In casing 400, the elements are arranged such that they match the electrical connections of casing type C shown in the schematic diagrams of FIGS. 1A-1D. For example, the rectifier holder 450 and the rectifier base 460 may be formed in an arrangement to guide the electrical leads of the resistor 430 and the two rectifier diodes 410, 420 to match the electrical connections of casing type C.

The single-wire contact 484 may electrically connect a second lead of the resistor 430 to a section of light-emitting elements. For example, the second lead (wire) of the resistor 430 may be inserted, from above, into a first lead hole of rectifier holder 450, and then come out of that first lead hole, from below, and then be folded back upward along a first lower exterior side of rectifier holder 450, wherein the fold in the second lead (wire) of the resistor 430 can form an electrical contact point to the single-wire contact 484 attached at the bottom part 462.

The first two-wire contact 480 may electrically connect a second lead of the first rectifier diode 410 to a first main (or bus) line. For example, the second lead (wire) of the first rectifier diode 410 may be inserted, from above, into a second lead hole of rectifier holder 450, and then come out of that second lead hole, from below, and then be folded back upward along a second lower exterior side of rectifier holder 450, wherein the fold in the second lead (wire) of the first rectifier diode 410 can form an electrical contact point to the first two-wire contact 480 attached at the bottom part 462.

The second two-wire contact 482 may electrically connect a second lead of the second rectifier diode 420 to a second main (or bus) line. For example, the second lead (wire) of the second rectifier diode 420 may be inserted, from above, into a third lead hole of rectifier holder 450, and then come out of that third lead hole, from below, and then be folded back upward along a third lower exterior side of rectifier holder 450, wherein the fold in the second lead (wire) of the second rectifier diode 420 can form an electrical contact point to the second two-wire contact 482 attached at the bottom part 462.

When the resistor 430 and the two rectifier diodes 410, 420 are inserted into the rectifier holder 450, the shape and size of the first, second, and third lower exterior sides of the rectifier holder 450 may be designed to prevent their folded leads from touching each other (e.g., suitably largely enough so that the lengths of the folded second leads cannot reach each other, suitably shaped like compartments so that the folded second leads cannot reach each other, etc.)

The rectifier holder 450 and the rectifier base 460 may guide a second lead of the resistor 430, a first lead of the first rectifier diode 410, and a first lead of the second rectifier diode 420 to electrically join together at a common electrical connection or contact or junction, as shown in the center of casing type C shown in the schematic diagrams of FIGS. 1A-1D. For example, when their second leads (wires) are inserted downward into their respective holes of rectifier holder 450, the center bodies of the resistor 430 and the two rectifier diodes 410, 420 may be held within an upper body of the rectifier holder 450 such that their second leads (wires) are sticking out upward, and thus the second leads (wires) may be twisted together to form the common electrical connection or contact or junction.

In the above discussions of FIGS. 2-4, the first electrical lead of a rectifier diode may connect to the anode terminal of the rectifier diode, and the second electrical lead of the rectifier diode may connect to the cathode terminal of the rectifier diode. In FIGS. 1A-1D, the anode terminal of a rectifier diode may be indicated by the flat end of its triangle symbol, and the cathode terminal of the rectifier diode may be indicated by its bar symbol.

By using the structures shown in FIGS. 2-4, rectifier diodes (e.g., 1N4001, 1N4007, or similar rectifier diodes) and resistor may be safely assembled into a plastic holder, and the light string circuit shown in FIGS. 1A-1D may be achieved through different connecting conductors for rectification and voltage reduction purposes. In FIGS. 2-4, resistor elements may or may not be added, depending on the target design requirements for a target light string circuit.

Figure 5A:
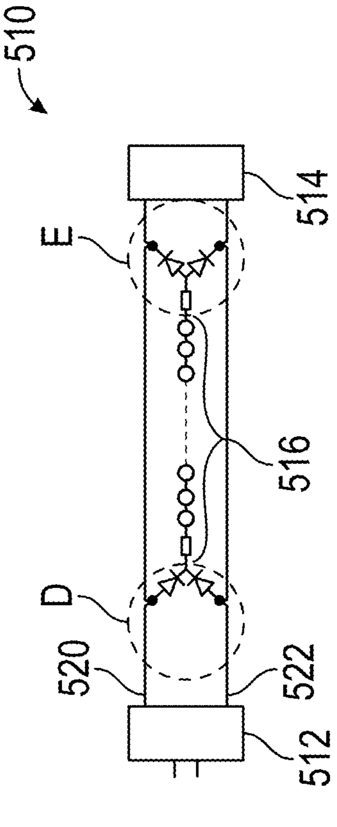
FIGS. 5A-5C illustrate schematic diagrams of further multiple types of light string circuits, according to embodiments of the disclosure.
Figure 5B:
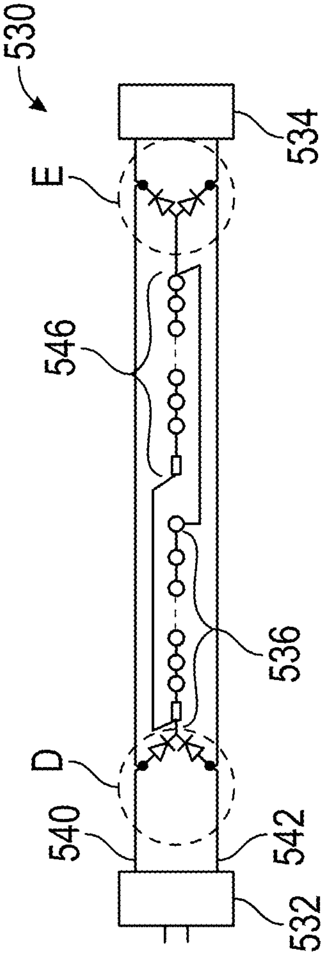
Figure 5C:
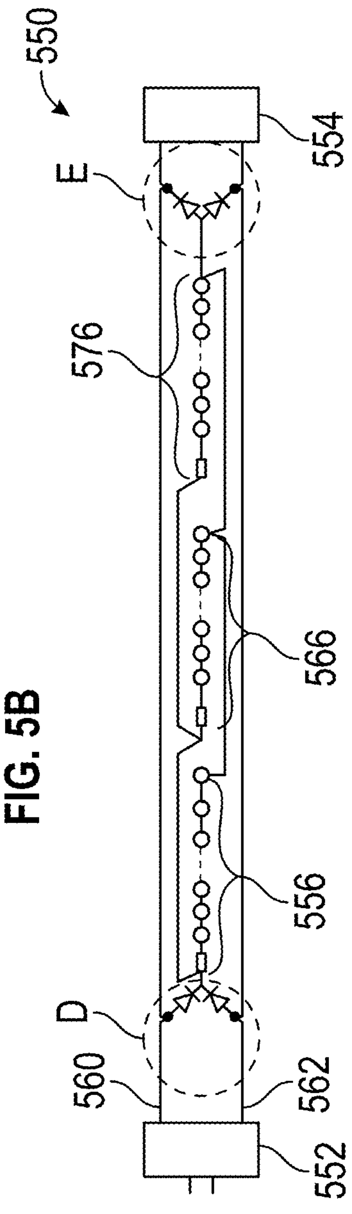

FIGS. 5A-5C illustrate schematic diagrams of further multiple types of light string circuits. A light string circuit may comprise one or more sections of electrical components. Each section may comprise one or more light-emitting elements. FIG. 5A shows a fifth type 510 of circuitry having a single section 516 including one or more light-emitting elements. FIG. 5B shows a sixth type 530 of circuitry having two sections 536, 546 each including one or more light-emitting elements. FIG. 5C shows a seventh type 550 of circuitry having three sections 556, 566, 576 each including one or more light-emitting elements. Teachings of FIGS. 5A-5C may be applied to high-voltage plug-in light strings, including high-voltage plug-in series parallel light strings. Light-emitting elements may include light-emitting diodes (LEDs) or other suitable light-emitting devices or light sources.

Each type of circuitry in FIGS. 5A-5C may include a respective connector (e.g., a plug, a male end, etc.) for connecting the respective light string circuit to a power source (e.g., an electrical outlet, AC (alternating current) power outlet, etc.). FIG. 5A shows an electrical plug 512. FIG. 5B shows an electrical plug 532. FIG. 5C shows an electrical plug 552.

Each type of circuitry in FIGS. 5A-5C may include a respective end part (e.g., a female end, a dead end, a termination cap, etc.) that is at another end of the light string from the power source end. FIG. 5A shows an end part 514. FIG. 5B shows an end part 534. FIG. 5C shows an end part 554. An end part may be a female end of a first light string circuit that can receive a male end (e.g., having an electrical plug) of a second light string circuit, so that two light string circuits can be joined together to create a longer run of light-emitting elements powered by a single power source. An end part may be a dead end of a termination cap where the end part is sealed or capped off, which may prevent the light string from extending further and help insulate the end part from moisture and dust, e.g., in outdoor usage environments.

Each type of circuitry in FIGS. 5A-5C may include overall parallel electrical lines that function to supply power from a power source to the electrical components, e.g., the light-emitting elements. Such overall parallel electrical lines may be called main lines or bus lines. FIG. 5A shows a first main (or bus) line 520 and a second main (or bus) line 522. FIG. 5B shows a first main (or bus) line 540 and a second main (or bus) line 542. FIG. 5C shows a first main (or bus) line 560 and a second main (or bus) line 562.

Each type of circuitry in FIGS. 5A-5C may include one or more casings of different casing types. FIG. 5A shows the fifth type 510 of circuitry having a casing type D and a casing type E at the ends of the single section 516 including one or more light-emitting elements. FIG. 5B shows the second type 530 of circuitry having, in order, a casing type D, then a first section 536 including one or more light-emitting elements and a second section 546 including one or more light-emitting elements, and then a casing type E. The first section 536 including one or more light-emitting elements and the second section 546 including one or more light-emitting elements may be electrically connected in a parallel arrangement. FIG. 5C shows the third type 550 of circuitry having, in order, a casing type D, a first section 556 including one or more light-emitting elements and a second section 566 including one or more light-emitting elements and a third section 576 including one or more light-emitting elements, and a casing type E. The first section 556 including one or more light-emitting elements, the second section 566 including one or more light-emitting elements, and the third section 576 including one or more light-emitting elements may be electrically connected in a parallel arrangement.

Figure 6:
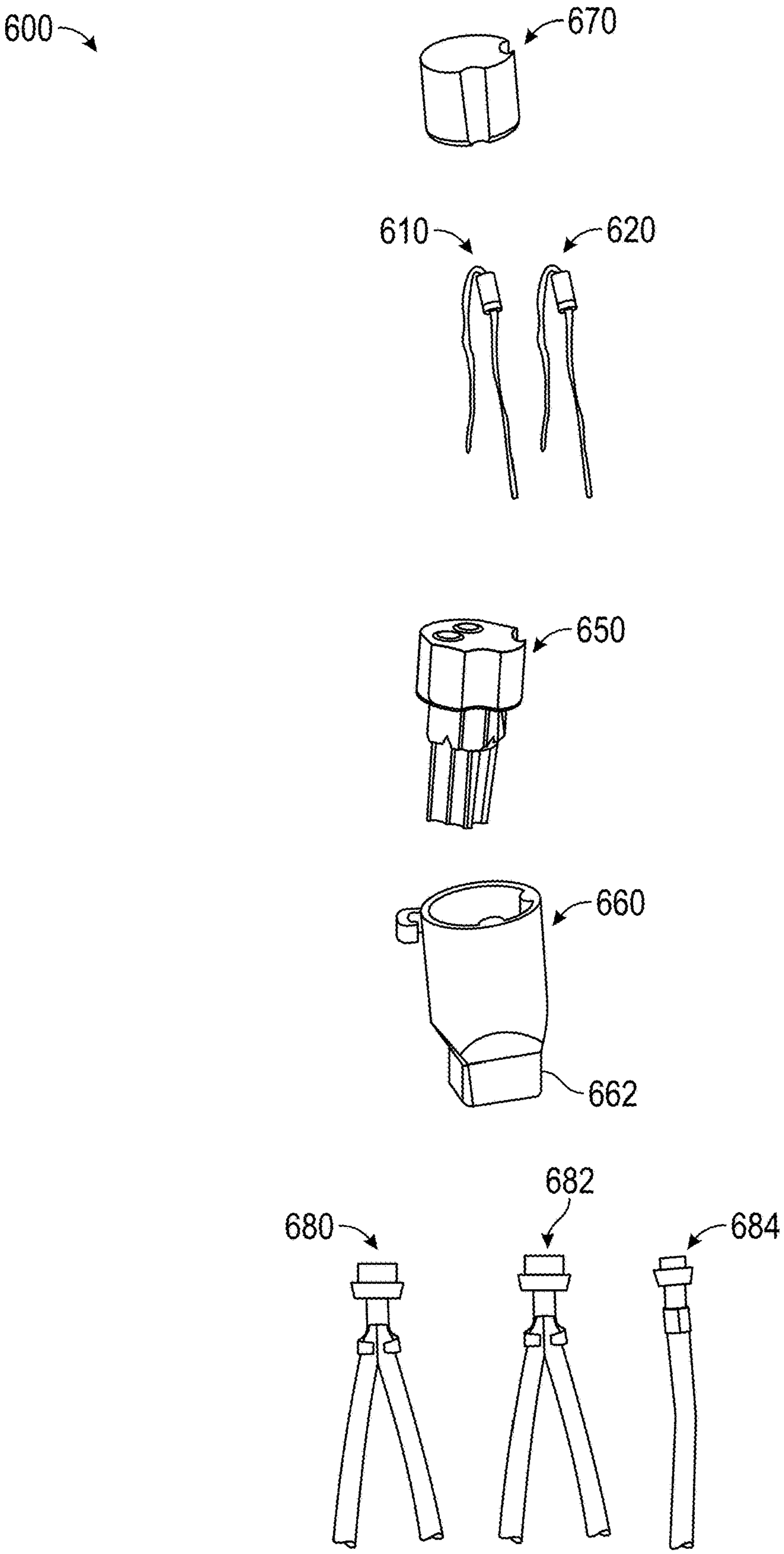
FIGS. 6-7 illustrate examples of the casing types D and E, respectively, according to embodiments of the disclosure.
Figure 7:
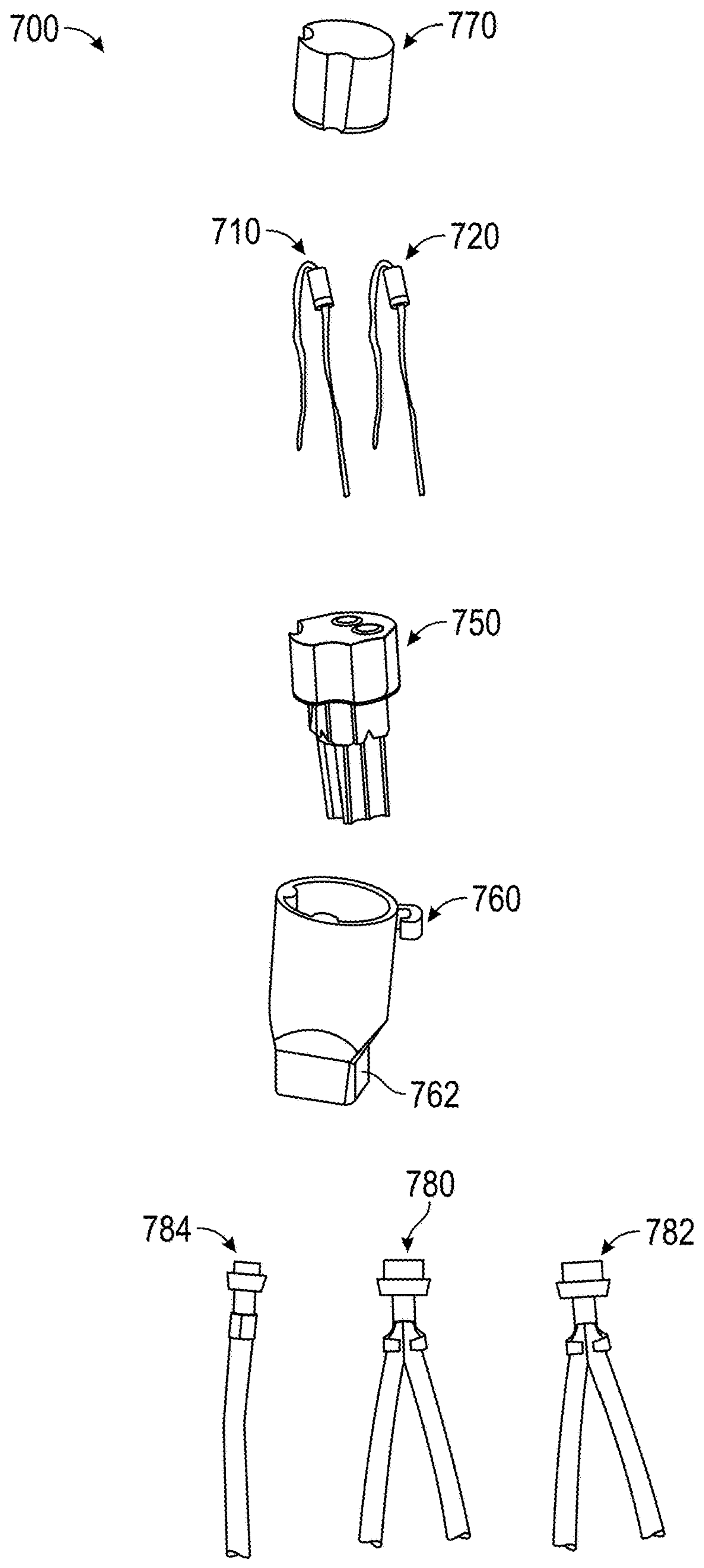

FIGS. 6-7 illustrate examples of the casing types D and E, respectively. The casing types A-C can encase electronic components (e.g., a rectifier diode, a resistor, etc.) and electrically connect the electronic components to electrical contacts of electrical conductors (e.g., electrical wires).

FIG. 6 shows an example casing 600 of casing type D where two rectifier diodes 610, 620 can be placed into a rectifier holder 650, which can be placed into a rectifier base 660. A top cap 670 with the rectifier base 660 may together encase the elements contained within the rectifier base 660 and the rectifier holder 650. The top cap 670 and the rectifier base 660 may form the encasement by any suitable, physically secure, electrically safe manner, e.g., attaching, affixing, snap-fit, screw-on threads, press-fit, friction-fit, latch, clip, etc.

A bottom part 662 of the rectifier base 660 may be formed to receive three electrical contacts: a first two-wire contact 680, a second two-wire contact 682, and a single-wire contact 684. To keep the contacts 680, 682, 684 electrically isolated from each other when attached or inserted into the bottom part 662, the rectifier holder 650 and/or the rectifier base 660 may include flanges or walls formed in a manner that isolates the contacts 680, 682, 684 when the rectifier holder 650 and the rectifier base 660 are assembled together. In casing 600, the elements are arranged such that they match the electrical connections of casing type D shown in the schematic diagrams of FIGS. 5A-5C. For example, the rectifier holder 650 and the rectifier base 660 may be formed in an arrangement to guide the electrical leads of the two rectifier diodes 610, 620 to match the electrical connections of casing type D.

The first two-wire contact 680 may electrically connect a first lead of the first rectifier diode 610 to a first main (or bus) line. For example, the first lead (wire) of the first rectifier diode 610 may be inserted, from above, into a first lead hole of rectifier holder 650, and then come out of that first lead hole, from below, and then be folded back upward along a first lower exterior side of rectifier holder 650, wherein the fold in the first lead (wire) of the first rectifier diode 610 can form an electrical contact point to the first two-wire contact 680 attached at the bottom part 662.

The second two-wire contact 682 may electrically connect a first lead of the second rectifier diode 620 to a second main (or bus) line. For example, the first lead (wire) of the second rectifier diode 620 may be inserted, from above, into a second lead hole of rectifier holder 650, and then come out of that second lead hole, from below, and then be folded back upward along a second lower exterior side of rectifier holder 650, wherein the fold in the first lead (wire) of the second rectifier diode 620 can form an electrical contact point to the second two-wire contact 682 attached at the bottom part 662.

When the two rectifier diodes 610, 620 are inserted into the rectifier holder 650, the shape and size of the first and second lower exterior sides of the rectifier holder 650 may be designed to prevent their folded leads from touching each other (e.g., suitably largely enough so that the lengths of the folded first leads cannot reach each other, suitably shaped like compartments so that the folded first leads cannot reach each other, etc.).

The single-wire contact 684 may electrically connect a second lead of the first rectifier diode 610 and a second lead of the second rectifier diode 620 to an electrical connection or contact or junction where one or more first leads of respective one or more resistors are electrically connected. A second lead of each resistor may be electrically connected to a respective section of light-emitting elements.

The rectifier holder 650 and the rectifier base 660 may guide the second lead of the first rectifier diode 610 and the second lead of the second rectifier diode 620 to electrically join together at a common electrical connection or contact or junction, as shown within casing type D shown in the schematic diagrams of FIGS. 5A-5C. For example, when their first leads (wires) are inserted downward into their respective holes of rectifier holder 650, the center bodies of the two rectifier diodes 610, 620 may be held within an upper body of the rectifier holder 650 such that their second leads (wires) are sticking out upward, and thus each of the second leads (wires) may be folded downward into a common third lead hole of rectifier holder 650, and then come out of that common third lead hole, from below, and then each be folded back upward along a third lower exterior side of rectifier holder 650. As the common third lead hole may receive both the second lead (wire) of the first rectifier diode 610 and the second lead (wire) of the second rectifier diode 620, they can be in close proximity to each other to touch or contact (e.g., at the common third lead hole, at their folds, at the third lower exterior side of rectifier holder 650, etc.) or be twisted together to form the common electrical connection or contact or junction. The fold in the second lead (wire) of the first rectifier diode 610 and/or the fold in the second lead (wire) of the second rectifier diode 620 can form an electrical contact point to the single-wire contact 684 attached at the bottom part 662.

For another example, instead of a common third lead hole, the rectifier holder 650 may comprise a third lead hole for receiving the second lead (wire) of the first rectifier diode 610 and a fourth lead hole for separately receiving the second lead (wire) of the second rectifier diode 620. The second lead (wire) of the first rectifier diode 610 may be inserted, from above, into the third lead hole of rectifier holder 650, and then come out of that third lead hole, from below, and then be folded back upward along a third lower exterior side of rectifier holder 650. The second lead (wire) of the second rectifier diode 620 may be separately inserted, from above, into a fourth lead hole of rectifier holder 650, and then come out of that fourth lead hole, from below, and then be folded back upward along the third lower exterior side of rectifier holder 650. The third lead hole and the fourth lead hole of rectifier holder 650 may be located in close proximity to each other, in order to guide both the second lead (wire) of the first rectifier diode 610 and the second lead (wire) of the second rectifier diode 620 to be in close proximity to each other to touch or contact, e.g., at their folds, at the third lower exterior side of rectifier holder 650, etc. The fold in the second lead (wire) of the first rectifier diode 610 and/or the fold in the second lead (wire) of the second rectifier diode 620 can form an electrical contact point to the single-wire contact 684 attached at the bottom part 662.

FIG. 7 shows an example casing 700 of casing type E where two rectifier diodes 710, 720 can be placed into a rectifier holder 750, which can be placed into a rectifier base 760. A top cap 770 with the rectifier base 760 may together encase the elements contained within the rectifier base 760 and the rectifier holder 750. The top cap 770 and the rectifier base 760 may form the encasement by any suitable, physically secure, electrically safe manner, e.g., attaching, affixing, snap-fit, screw-on threads, press-fit, friction-fit, latch, clip, etc.

A bottom part 762 of the rectifier base 760 may be formed to receive three electrical contacts: a single-wire contact 784, a first two-wire contact 780, and a second two-wire contact 782. To keep the contacts 784, 780, 782 electrically isolated from each other when attached or inserted into the bottom part 762, the rectifier holder 750 and/or the rectifier base 760 may include flanges or walls formed in a manner that isolates the contacts 784, 780, 782 when the rectifier holder 750 and the rectifier base 760 are assembled together. In casing 700, the elements are arranged such that they match the electrical connections of casing type E shown in the schematic diagrams of FIGS. 5A-5C. For example, the rectifier holder 750 and the rectifier base 760 may be formed in an arrangement to guide the electrical leads of the two rectifier diodes 710, 720 to match the electrical connections of casing type E.

The single-wire contact 784 may electrically connect a first lead of the first rectifier diode 710 and a first lead of the second rectifier diode 720 to a section of light-emitting elements.

The first two-wire contact 780 may electrically connect a second lead of the first rectifier diode 710 to a first main (or bus) line. For example, the second lead (wire) of the first rectifier diode 710 may be inserted, from above, into a first lead hole of rectifier holder 750, and then come out of that first lead hole, from below, and then be folded back upward along a first lower exterior side of rectifier holder 750, wherein the fold in the second lead (wire) of the first rectifier diode 710 can form an electrical contact point to the first two-wire contact 780 attached at the bottom part 762.

The second two-wire contact 782 may electrically connect a second lead of the second rectifier diode 720 to a second main (or bus) line. For example, the second lead (wire) of the second rectifier diode 720 may be inserted, from above, into a second lead hole of rectifier holder 750, and then come out of that second lead hole, from below, and then be folded back upward along a second lower exterior side of rectifier holder 750, wherein the fold in the second lead (wire) of the second rectifier diode 720 can form an electrical contact point to the second two-wire contact 782 attached at the bottom part 762.

When the two rectifier diodes 710, 720 are inserted into the rectifier holder 750, the shape and size of the first and second lower exterior sides of the rectifier holder 750 may be designed to prevent their folded leads from touching each other (e.g., suitably largely enough so that the lengths of the folded second leads cannot reach each other, suitably shaped like compartments so that the folded second leads cannot reach each other, etc.).

The rectifier holder 750 and the rectifier base 760 may guide the first lead of the first rectifier diode 710 and the first lead of the second rectifier diode 720 to electrically join together at a common electrical connection or contact or junction, as shown within casing type E shown in the schematic diagrams of FIGS. 5A-5C. For example, when their second leads (wires) are inserted downward into their respective holes of rectifier holder 750, the center bodies of the two rectifier diodes 710, 720 may be held within an upper body of the rectifier holder 750 such that their first leads (wires) are sticking out upward, and thus each of the first leads (wires) may be folded downward into a common third lead hole of rectifier holder 750, and then come out of that common third lead hole, from below, and then each be folded back upward along a third lower exterior side of rectifier holder 750. As the common third lead hole may receive both the first lead (wire) of the first rectifier diode 710 and the first lead (wire) of the first rectifier diode 720, they can be in close proximity to each other to touch or contact (e.g., at the common third lead hole, at their folds, at the third lower exterior side of rectifier holder 650, etc.) or be twisted together to form the common electrical connection or contact or junction. The fold in the first lead (wire) of the first rectifier diode 710 and/or the fold in the first lead (wire) of the second rectifier diode 720 can form an electrical contact point to the single-wire contact 784 attached at the bottom part 762.

For another example, instead of a common third lead hole, the rectifier holder 750 may comprise a third lead hole for receiving the first lead (wire) of the first rectifier diode 710 and a fourth lead hole for separately receiving the first lead (wire) of the second rectifier diode 720. The first lead (wire) of the first rectifier diode 710 may be inserted, from above, into the third lead hole of rectifier holder 750, and then come out of that third lead hole, from below, and then be folded back upward along a third lower exterior side of rectifier holder 750. The first lead (wire) of the second rectifier diode 720 may be separately inserted, from above, into a fourth lead hole of rectifier holder 750, and then come out of that fourth lead hole, from below, and then be folded back upward along the third lower exterior side of rectifier holder 750. The third lead hole and the fourth lead hole of rectifier holder 750 may be located in close proximity to each other, in order to guide both the first lead (wire) of the first rectifier diode 710 and the first lead (wire) of the second rectifier diode 720 to be in close proximity to each other to touch or contact, e.g., at their folds, at the third lower exterior side of rectifier holder 750, etc. The fold in the first lead (wire) of the first rectifier diode 710 and/or the fold in the first lead (wire) of the second rectifier diode 720 can form an electrical contact point to the single-wire contact 784 attached at the bottom part 762.

In the above discussions of FIGS. 6-7, the first electrical lead of a rectifier diode may connect to the anode terminal of the rectifier diode, and the second electrical lead of the rectifier diode may connect to the cathode terminal of the rectifier diode. In FIGS. 5A-5C, the anode terminal of a rectifier diode may be indicated by the flat end of its triangle symbol, and the cathode terminal of the rectifier diode may be indicated by its bar symbol.

By using the structures shown in FIGS. 6-7, rectifier diodes (e.g., 1N4001, 1N4007, or similar rectifier diodes) may be safely assembled into a plastic holder, and the light string circuit shown in FIGS. 5A-5C may be achieved through different connecting conductors for rectification purposes.

In FIGS. 2-4 and 6-7, some or all of a top cap may fit into a cavity of a rectifier base structure. Alternatively, the bottom of a top cap may comprise a lower flange that may fit into a top lip of a rectifier base structure. The top cap may comprise one or more longitudinal grooves. When the top cap and the rectifier base are fitted together, they may encase a rectifier holder structure. The rectifier holder structure may comprise an upper part having one or more cavities that may collectively or each individually receive an electrical component (e.g., rectifier diode, resistor) having two electrical leads. When placed into the one or more cavities of the upper part of the rectifier holder structure, each of the electrical component's two leads may be guided or directed to a suitable location and position for corresponding to the electrical circuit schematic of the respective casing type (e.g., via one or more lead holes per electrical component, etc.). The rectifier holder structure may comprise one or more longitudinal grooves that align with the one or more longitudinal grooves of the top cap. The rectifier holder structure may fit into the top cap, where their respective one or more longitudinal grooves may align and hold the rectifier holder structure and the top cap into a fixed positional arrangement. The rectifier base may have a single larger cavity to receive the rectifier holder structure including its multiple electrical elements. The rectifier base may comprise one or more longitudinal tongues that can fit with the one or more longitudinal grooves of the top cap or the one or more longitudinal grooves of the rectifier holder structure. The top cap (or the rectifier holder structure) may fit into the rectifier base, where the one or more longitudinal grooves of the top cap (or of the rectifier holder structure) and the one or more longitudinal tongues of the rectifier base may align and hold the top cap (or the rectifier holder structure) and the rectifier base into a fixed positional arrangement. The rectifier base's bottom may comprise multiple slots to respectively receive multiple tabs each having an electrical contact. When placed into the rectifier base, the leads of the multiple electrical components in the rectifier holder structure may align to connect with respective target electrical contacts of the multiple tabs via the multiple slots of the rectifier base. The rectifier base may comprise an external wire-clip or wire-hooking flange, which can clip or hook onto a wire of the light string circuit (e.g., one of the wires attached to the multiple tabs inserted into the multiple slots of the rectifier base's bottom), for any desired purpose (e.g., flattening the profile of the rectifier base along a wire so that it does not stick out prominently in a way that visually distracts from the aesthetic focus of the sections of light-emitting elements).

The top caps, the rectifier holders, and the rectifier bases may be made of plastic and shaped with the generally round aspects shown, but these casing elements are not so limited to such specific details. These casing elements may be made of any suitable electrically insulating material. These casing elements may have any shape or form (e.g., round, rectilinear, angular, ellipsoid, etc.) suitable for the encasing of rectifying or voltage-reducing elements.

Although embodiments of this disclosure have been fully described with reference to the accompanying drawings, it is to be noted that various changes and modifications will become apparent to those skilled in the art. Such changes and modifications are to be understood as being included within the scope of embodiments of this disclosure as defined by the appended claims.

What is claimed is:

1. An apparatus comprising:

an electronic component holder structure including one or more first cavities for holding a plurality of electronic components to be electrically connected to one or more light-emitting elements external from the apparatus;

a base structure including a second cavity for receiving the electronic component holder structure when holding the plurality of electronic components, wherein the second cavity is larger than each first cavity of one or more first cavities; and a cap structure, wherein the base structure and the cap structure together encase the electronic component holder structure when holding the plurality of electronic components, wherein the one or more light-emitting elements are separate and external from the cap structure, wherein the base structure includes a bottom part for receiving a plurality of electrical contacts, wherein the plurality of electrical contacts includes one or more electrical contacts that electrically connects with one or more input electrical lines that function to supply power for the one or more light-emitting elements, and wherein the plurality of electrical contacts includes at least one electrical contact that electrically connects with at least one output electrical line that electrically connects to the one or more light-emitting elements.

2. The apparatus of claim 1, wherein:

the electronic component holder structure includes the one or more first cavities for holding the plurality of electronic components including one or more rectifier diodes.

3. The apparatus of claim 2, wherein:

the one or more first cavities for holding the plurality of electronic components includes a resistor.

4. The apparatus of claim 1, wherein:

the bottom part comprises a plurality of slots for receiving a plurality of tabs, each tab having a corresponding electrical contact of the plurality of electrical contacts.

5. The apparatus of claim 1, wherein:

the electronic component holder structure comprises one or more first longitudinal grooves, the cap structure comprises one or more second longitudinal grooves, wherein, when the base structure and the cap structure together encase the electronic component holder structure, the one or more first longitudinal grooves and the one or more second longitudinal grooves align and hold the electronic component holder structure and the cap structure into a fixed positional arrangement.

6. The apparatus of claim 1, wherein:

the cap structure comprises one or more longitudinal grooves, the base structure comprises one or more longitudinal tongues, wherein, when the base structure and the cap structure together encase the electronic component holder structure, the one or more longitudinal grooves and the one or more longitudinal tongues align and hold the cap structure and the base structure into a fixed positional arrangement.

7. The apparatus of claim 1, wherein:

the electronic component holder structure, the base structure, and the cap structure are made of plastic.

8. The apparatus of claim 1, wherein:

the electronic component holder structure, the base structure, and the cap structure are shaped in round forms.

* * * * *